United States Patent
Huang

(10) Patent No.: US 10,409,502 B2
(45) Date of Patent: Sep. 10, 2019

(54) METHOD AND APPARATUS FOR WRITING METADATA INTO CACHE

(71) Applicant: HUAWEI TECHNOLOGIES CO., LTD., Shenzhen, Guangdong (CN)

(72) Inventor: Futang Huang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/867,120

(22) Filed: Jan. 10, 2018

(65) Prior Publication Data

US 2018/0129429 A1 May 10, 2018

Related U.S. Application Data

(63) Continuation of application No. PCT/CN2016/087705, filed on Jun. 29, 2016.

(30) Foreign Application Priority Data

Sep. 8, 2015 (CN) .......................... 2015 1 0568241

(51) Int. Cl.
  *G06F 12/00* (2006.01)
  *G06F 3/06* (2006.01)
  (Continued)

(52) U.S. Cl.
  CPC .......... *G06F 3/0616* (2013.01); *G06F 3/0659* (2013.01); *G06F 3/0679* (2013.01);
  (Continued)

(58) Field of Classification Search
  CPC ............. G06F 12/0815; G06F 12/0866; G06F 2003/0691; G06F 2212/214; G06F 2212/222; G06F 3/064
  (Continued)

(56) References Cited

U.S. PATENT DOCUMENTS 6,505,284 B1   1/2003 Rabinovici et al.
2012/0079231 A1   3/2012 Huang et al.
(Continued)

FOREIGN PATENT DOCUMENTS

CN   101470667 A   7/2009
CN   103473185 A   12/2013
(Continued)

OTHER PUBLICATIONS

International Search Report and Written in International Application No. PCT/CN2016/087705, dated Oct. 9, 2016, 15 pages.
Chinese Office Action in Chinese Application No. 201510568241, dated Jul. 31, 2017, 26 pages.
(Continued)

*Primary Examiner* — Mardochee Chery
(74) *Attorney, Agent, or Firm* — Fish & Richardson P.C.

(57) ABSTRACT

An example method and an example apparatus for writing data into a cache are described herein. The example method includes receiving an IO request write command, where the IO request write command includes metadata of to-be-written data. A first buddy group is obtained from a global buddy queue, and a determination as to whether all metadata of the to-be-written data can be written into the first buddy group is made. If the determination is yes, all the metadata of the to-be-written data is written into the first buddy group, and all the metadata of the to-be-written data is written into a metadata block corresponding to a metadata group to which the first buddy group belongs.

17 Claims, 6 Drawing Sheets

(51) Int. Cl.
  *G06F 12/08* (2016.01)
  *G06F 12/084* (2016.01)
  *G06F 12/02* (2006.01)
  *G06F 12/0815* (2016.01)
  *G06F 12/0866* (2016.01)

(52) U.S. Cl.
  CPC ........ *G06F 12/023* (2013.01); *G06F 12/0246* (2013.01); *G06F 12/08* (2013.01); *G06F 12/084* (2013.01); *G06F 3/064* (2013.01); *G06F 12/0815* (2013.01); *G06F 12/0866* (2013.01); *G06F 2003/0691* (2013.01); *G06F 2212/214* (2013.01); *G06F 2212/222* (2013.01); *G06F 2212/604* (2013.01)

(58) Field of Classification Search
  USPC .......................................................... 711/103
  See application file for complete search history.

(56) References Cited

U.S. PATENT DOCUMENTS

2014/0244901 A1    8/2014  Panda et al.
2015/0242321 A1    8/2015  Iyigun et al.
2016/0011984 A1*   1/2016  Speer .................. G06F 12/0891
                                                            711/102
2018/0307609 A1*  10/2018  Qiang ................. G06F 12/0868

FOREIGN PATENT DOCUMENTS

CN    103488582 A    1/2014
CN    104238962 A   12/2014
CN    105117351 A   12/2015

OTHER PUBLICATIONS

Extended European Search Report issued in European Application No. 16843508.9 dated Jun. 21, 2018, 10 pages.

* cited by examiner

METHOD AND APPARATUS FOR WRITING METADATA INTO CACHE

CROSS-REFERENCE TO RELATED APPLICATIONS

This application is a continuation of International Application No. PCT/CN2016/087705, filed on Jun. 29, 2016, which claims priority to Chinese Patent Application No. 201510568241.0, filed on Sep. 8, 2015. The disclosures of the aforementioned applications are hereby incorporated by reference in their entireties.

TECHNICAL FIELD

Embodiments of the present invention relate to the data storage field, and in particular, to a method and an apparatus for writing data into a cache.

BACKGROUND

In an existing read/write cache (Cache) in the industry, a used storage medium is usually based on a Non-Volatile Dual In-line Memory Module (NVDIMM) or a non-volatile random access memory (Non-Volatile Random Access Memory, NVRAM). However, if the storage medium is based on the foregoing devices, the write cache usually has a relatively small capacity and has difficulty in dealing with a scenario of heavy random write pressure.

In the prior art, a flash (Flash) device is used as a cache. To ensure data security, IO needs to be performed twice for each write request, one is IO for writing data, and the other is IO for writing metadata. A lifetime of the flash is directly related to write times. For example, a multi-level cell (Multi-Level Cell, MLC) flash is usually written for only approximately 5000 to 10000 times. A size of the metadata is usually between 30 B and 64 B. If IO is directly performed on each piece of metadata according to the size of the metadata, performance of the flash cannot be given full play. If IO is performed on the metadata that is aligned according to 4 K, a write amplification problem may exist, and the lifetime of the entire flash is significantly affected.

SUMMARY

Embodiments of the present invention provide a method and an apparatus for writing data into a cache, so as to resolve a problem that a lifetime of a flash is affected because metadata is frequently written into the flash.

According to a first aspect, an embodiment of the present invention provides a method for writing data into a cache, where a storage area of a flash of the cache includes multiple chunks, one chunk includes one chunk metadata area and one chunk data area, the chunk metadata area includes at least one metadata block, the chunk data area includes at least one data area corresponding to the at least one metadata block, the metadata block includes multiple pieces of metadata, the data area includes multiple data blocks, the metadata block is in a one-to-one correspondence with the data area, the metadata is in a one-to-one correspondence with the data block, and the method includes:

receiving an IO request write command, where the IO request write command includes metadata of to-be-written data;

obtaining a buddy group that is currently being processed from a global buddy queue, and using the buddy group as a first buddy group, where each buddy group includes multiple cache blocks in a memory, each buddy group belongs to one metadata group, and one metadata group is corresponding to one metadata block;

determining whether the first buddy group has a remaining cache block and whether all metadata of the to-be-written data can be written into the remaining cache block; and when the first buddy group has the remaining cache block and all the metadata of the to-be-written data can be written into the remaining cache block, writing all the metadata of the to-be-written data into the remaining cache block in the first buddy group, and writing all the metadata of the to-be-written data into a metadata block corresponding to a metadata group to which the first buddy group belongs.

With reference to the first aspect, in a first implementation of the first aspect, when the first buddy group has no remaining cache block or all the metadata of the to-be-written data cannot be written into the remaining cache block, it is determined whether a buddy queue of the metadata group to which the first buddy group belongs has a second buddy group in which all the metadata of the to-be-written data can be written into a remaining cache block, and if the buddy queue has the second buddy group, the second buddy group is obtained from the buddy queue of the metadata group to which the first buddy group belongs, all the metadata of the to-be-written data is written into the remaining cache block in the second buddy group, and all the metadata of the to-be-written data is written into a metadata block corresponding to a metadata group to which the second buddy group belongs, where the global buddy queue includes buddy groups included in buddy queues of all metadata groups.

With reference to the first implementation of the first aspect, in a second implementation of the first aspect, when the buddy queue of the metadata group to which the first buddy group belongs has no second buddy group in which all the metadata of the to-be-written data can be written into a remaining cache block, it is determined whether the global buddy queue has a third buddy group in which all the metadata of the to-be-written data can be written into a remaining cache block, and if the global buddy queue has the third buddy group, the third buddy group is obtained from the global buddy queue, all the metadata of the to-be-written data is written into the remaining cache block in the third buddy group, and all the metadata of the to-be-written data is written into a metadata block corresponding to a metadata group to which the third buddy group belongs.

With reference to the second implementation of the first aspect, in a third implementation of the first aspect, when the global buddy queue has no third buddy group in which all the metadata of the to-be-written data can be written into a remaining cache block, it is determined whether a global single cache queue has enough remaining cache blocks into which all the metadata of the to-be-written data can be written, and if the global single cache queue has enough remaining cache blocks, the remaining cache blocks into which all the metadata of the to-be-written data can be written are obtained from the global single cache queue, all the metadata of the to-be-written data is written into the obtained remaining cache blocks in the global single cache queue, and all the metadata of the to-be-written data is correspondingly written into metadata blocks corresponding to metadata groups to which the remaining cache blocks in the global single cache queue belong, where the global single cache queue includes single cache blocks that are included in single cache queues of all metadata groups and that cannot form a buddy group with another cache block.

With reference to the first aspect, in a fourth implementation of the first aspect, the cache blocks included in each buddy group are successively arranged according to addresses.

With reference to the first aspect, in a fifth implementation of the first aspect, a quantity of remaining cache blocks included in each buddy group is recorded in both the global buddy queue and a buddy queue of the metadata group, and a quantity of remaining cache blocks that is recorded in the global buddy queue is different from a quantity of remaining cache blocks that is recorded in a buddy queue of each metadata group.

With reference to the first aspect, or the first, the second, the third, the fourth, or the fifth implementation of the first aspect, in a sixth implementation of the first aspect, after the receiving an IO request write command, and before the obtaining a buddy group that is currently being processed from a global buddy queue and using the buddy group as a first buddy group, the method further includes:
  determining, according to a size of the data block, whether the IO request write command needs to be split;
  if the IO request write command needs to be split, splitting the IO request write command according to the size of the data block, to obtain multiple first IO request write commands; and
  for the multiple first IO request write commands, determining whether metadata that is of the to-be-written data and that is included in each first IO request write command is cached in the memory, and if yes, directly performing a write operation, or if no, performing the step of obtaining a buddy group that is currently being processed from a global buddy queue and using the buddy group as a first buddy group.

With reference to the first aspect, in a seventh implementation of the first aspect, when multiple buddy groups are recorded in any queue in the global buddy queue, the multiple buddy groups are arranged according to a quantity of remaining cache blocks included in each buddy group; and/or when multiple buddy groups are recorded in any queue in a buddy queue of the metadata group, the multiple buddy groups are arranged according to a quantity of remaining cache blocks included in each buddy group.

With reference to the first aspect, in an eighth implementation of the first aspect, the method further includes:
  receiving a metadata recycling instruction, where the metadata recycling instruction includes an index of a cache block to which to-be-recycled metadata belongs;
  obtaining a former cache block and a latter cache block of the cache block according to the index of the cache block;
  combining the cache block with an idle-state cache block in the former cache block and the latter cache block into a new buddy group; and
  adding the new buddy group to the global buddy queue and a buddy queue of the metadata group according to a quantity of cache blocks included in the new buddy group.

With reference to the eighth implementation of the first aspect, in a ninth implementation of the first aspect, if the idle-state cache block in the former cache block and the latter cache block belongs to a buddy group, the new buddy group includes the cache block and a cache block that is included in the buddy group to which the idle-state cache block in the former cache block and the latter cache block belongs.

With reference to the eighth implementation of the first aspect, in a tenth implementation of the first aspect, if neither the former cache block nor the latter cache block is in an idle state, the cache block is added to a global single cache queue and a single cache queue of the metadata group.

According to a second aspect, an embodiment of the present invention provides an apparatus for writing data into a cache, where a storage area of a flash of the apparatus includes multiple chunks, one chunk includes one chunk metadata area and one chunk data area, the chunk metadata area includes at least one metadata block, the chunk data area includes at least one data area corresponding to the at least one metadata block, the metadata block includes multiple pieces of metadata, the data area includes multiple data blocks, the metadata block is in a one-to-one correspondence with the data area, the metadata is in a one-to-one correspondence with the data block, and the apparatus includes:
  a receiving unit, configured to receive an IO request write command, where the IO request write command includes metadata of to-be-written data;
  a first obtaining unit, configured to: obtain a buddy group that is currently being processed from a global buddy queue, and use the buddy group as a first buddy group, where each buddy group includes multiple cache blocks in a memory, each buddy group belongs to one metadata group, and one metadata group is corresponding to one metadata block;
  a determining unit, configured to determine whether the first buddy group has a remaining cache block and whether all metadata of the to-be-written data can be written into the remaining cache block; and
  a first writing unit, configured to: when the first buddy group has the remaining cache block and all the metadata of the to-be-written data can be written into the remaining cache block, write all the metadata of the to-be-written data into the remaining cache block in the first buddy group, and write all the metadata of the to-be-written data into a metadata block corresponding to a metadata group to which the first buddy group belongs.

With reference to the second aspect, in a first implementation of the second aspect, the apparatus further includes:
  a second obtaining unit, configured to: when the determining unit determines that the first buddy group has no remaining cache block or all the metadata of the to-be-written data cannot be written into the remaining cache block, determine whether a buddy queue of the metadata group to which the first buddy group belongs has a second buddy group in which all the metadata of the to-be-written data can be written into a remaining cache block, and if the buddy queue has the second buddy group, obtain the second buddy group from the buddy queue of the metadata group to which the first buddy group belongs; and
  a second writing unit, configured to: write all the metadata of the to-be-written data into the remaining cache block in the second buddy group, and write all the metadata of the to-be-written data into a metadata block corresponding to a metadata group to which the second buddy group belongs, where the global buddy queue includes buddy groups included in buddy queues of all metadata groups.

With reference to the first implementation of the second aspect, in a second implementation of the second aspect, the apparatus further includes:

a third obtaining unit, configured to: when the determining unit determines that the buddy queue of the metadata group to which the first buddy group belongs has no second buddy group in which all the metadata of the to-be-written data can be written into a remaining cache block, determine whether the global buddy queue has a third buddy group in which all the metadata of the to-be-written data can be written into a remaining cache block, and if the global buddy queue has the third buddy group, obtain the third buddy group from the global buddy queue; and a third writing unit, configured to: write all the metadata of the to-be-written data into the remaining cache block in the third buddy group, and write all the metadata of the to-be-written data into a metadata block corresponding to a metadata group to which the third buddy group belongs.

With reference to the second implementation of the second aspect, in a third implementation of the second aspect, the apparatus further includes:

a fourth obtaining unit, configured to: when the determining unit determines that the global buddy queue has no third buddy group in which all the metadata of the to-be-written data can be written into a remaining cache block, determine whether a global single cache queue has enough remaining cache blocks into which all the metadata of the to-be-written data can be written, and if the global single cache queue has enough remaining cache blocks, obtain, from the global single cache queue, the remaining cache blocks into which all the metadata of the to-be-written data can be written; and a fourth writing unit, configured to: write all the metadata of the to-be-written data into the obtained remaining cache blocks in the global single cache queue, and correspondingly write all the metadata of the to-be-written data into metadata blocks corresponding to metadata groups to which the remaining cache blocks in the global single cache queue belong, where the global single cache queue includes single cache blocks that are included in single cache queues of all metadata groups and that cannot form a buddy group with another cache block.

With reference to the second aspect, in a fourth implementation of the second aspect, the cache blocks included in each buddy group are successively arranged according to addresses.

With reference to the second aspect, in a fifth implementation of the second aspect, a quantity of remaining cache blocks included in each buddy group is recorded in both the global buddy queue and a buddy queue of the metadata group, and a quantity of remaining cache blocks that is recorded in the global buddy queue is different from a quantity of remaining cache blocks that is recorded in a buddy queue of each metadata group.

With reference to the second aspect, or the first, the second, the third, the fourth, or the fifth implementation of the second aspect, in a sixth implementation of the second aspect, the determining unit is further configured to determine, according to a size of the data block, whether the IO request write command needs to be split;

the apparatus further includes:

a split unit, configured to: when the determining unit determines that the IO request write command needs to be split, split the IO request write command according to the size of the data block, to obtain multiple first IO request write commands; and the determining unit is further configured to: for the multiple first IO request write commands, determine whether metadata that is of the to-be-written data and that is included in each first IO request write command is cached in the memory, and if yes, directly perform a write operation, or if no, perform the step of obtaining a buddy group that is currently being processed from a global buddy queue and using the buddy group as a first buddy group.

With reference to the second aspect, in a seventh implementation of the second aspect, the apparatus further includes:

an arrangement unit, configured to: when multiple buddy groups are recorded in any queue in the global buddy queue, arrange the multiple buddy groups according to a quantity of remaining cache blocks included in each buddy group; and/or when multiple buddy groups are recorded in any queue in a buddy queue of the metadata group, arrange the multiple buddy groups according to a quantity of remaining cache blocks included in each buddy group.

With reference to the second aspect, in an eighth implementation of the second aspect, the receiving unit is further configured to receive a metadata recycling instruction, where the metadata recycling instruction includes an index of a cache block to which to-be-recycled metadata belongs; and the apparatus further includes:

a fifth obtaining unit, configured to obtain a former cache block and a latter cache block of the cache block according to the index of the cache block; and an adding unit, configured to: combine the cache block with an idle-state cache block in the former cache block and the latter cache block into a new buddy group, and add the new buddy group to the global buddy queue and a buddy queue of the metadata group according to a quantity of cache blocks included in the new buddy group.

With reference to the eighth implementation of the second aspect, in a ninth implementation of the second aspect, if the idle-state cache block in the former cache block and the latter cache block belongs to a buddy group, the new buddy group includes the cache block and a cache block that is included in the buddy group to which the idle-state cache block in the former cache block and the latter cache block belongs.

With reference to the eighth implementation of the second aspect, in a tenth implementation of the second aspect, the adding unit is further configured to: when neither the former cache block nor the latter cache block is in an idle state, add the cache block to a global single cache queue and a single cache queue of the metadata group.

It may be learned from the foregoing technical solutions that the embodiments of the present invention have the following advantages:

In the embodiments of the present invention, the remaining cache block in the memory is recorded by using the buddy group, and when the IO request write command is received, the remaining cache block is obtained from the buddy group, and all the metadata of the to-be-written data that is included in the IO request write command is written into the remaining cache block obtained from a same buddy group, so as to increase a probability of combining the metadata and further resolve a problem that a lifetime of the flash is affected by write amplification caused when the metadata is frequently written into the flash.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

To provide thorough understanding of the present invention, the following further describes the embodiments of the present invention in detail with reference to the accompanying drawings. The foregoing embodiments do not limit the protection scope of the present invention.

Figure 1:
FIG. 1 is a schematic diagram of a data layout of a flash according to the present invention.

FIG. 1 is a schematic diagram of a data layout of a flash according to the present invention. As shown in FIG. 1, a storage area of the flash may include three parts: a superblock, a metadata area, and a data area.

The superblock is used to store global data in a cache, and is mainly for storing data required when a system is recovered from breakdown. The global data may include a size of a metadata block, a size of a data block, and the like.

Metadata (metadata) is data for maintaining a data block in a storage system, and is used to describe and organize a relationship between data blocks. A size of the metadata is determined according to a size of a data structure defined in the system.

The metadata area is an area for storing metadata.

The data area is used to store actual data in the cache, and may include multiple data blocks.

Figure 2:
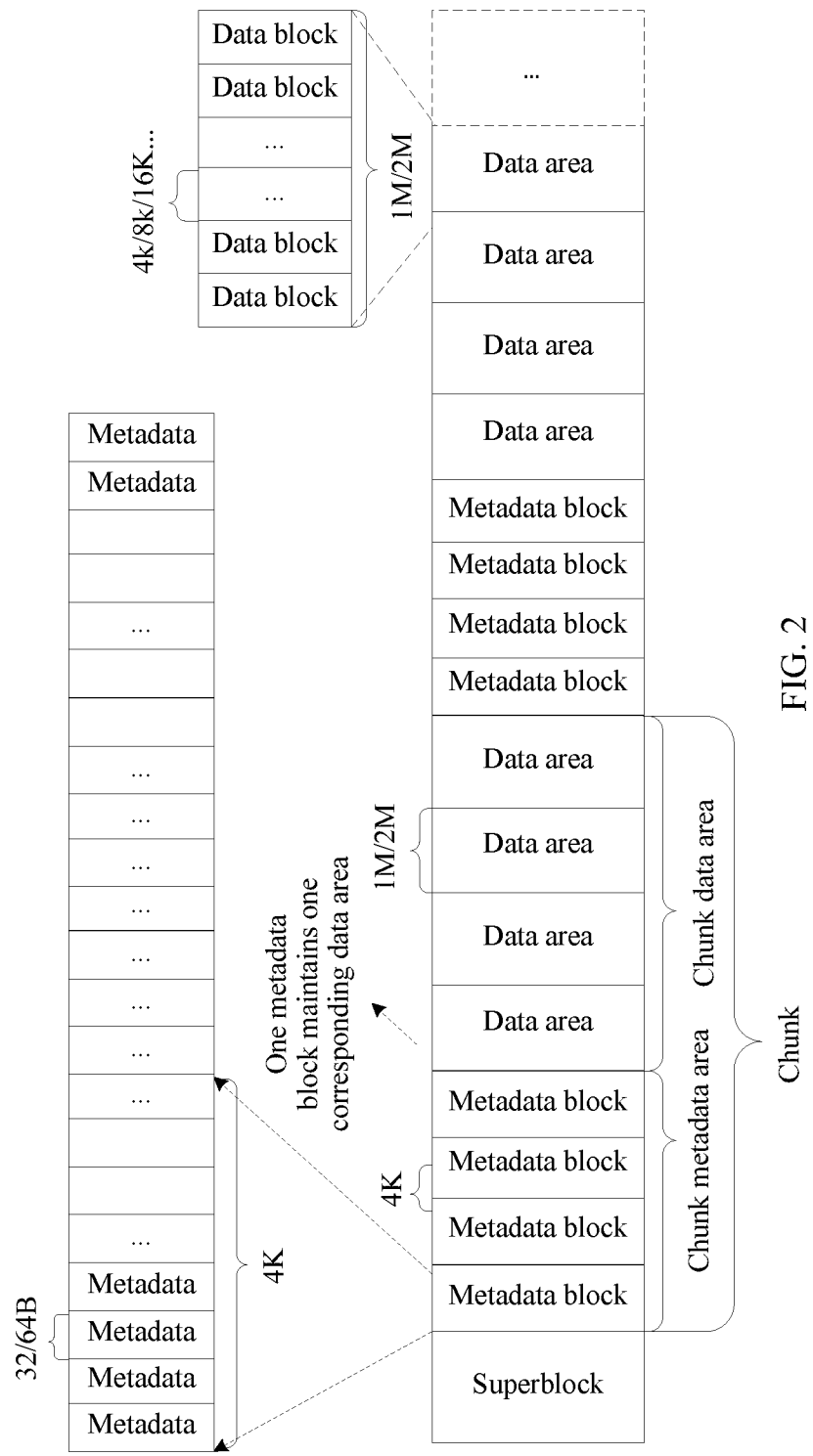
FIG. 2 is a schematic diagram of another data layout of a flash according to the present invention.

FIG. 2 is a schematic diagram of another data layout of a flash according to the present invention. As shown in FIG. 2, the flash includes a superblock and multiple chunks (chunk), each chunk includes one chunk metadata area and one chunk data area, each chunk metadata area includes one or more metadata blocks, and each chunk data area includes a data area corresponding to the one or more metadata blocks. The data area included in each chunk data area is in a one-to-one correspondence with a metadata block that is corresponding to the data area and that is in the chunk metadata area. One metadata block is for maintaining one corresponding data area. Specifically, each metadata area includes multiple pieces of metadata, and each piece of metadata is corresponding to one data block in the data area.

In FIG. 2, although one chunk metadata area includes four metadata blocks, it does not indicate that one chunk metadata area can include only four metadata blocks. The chunk metadata area may include one, two, or more metadata blocks. Similarly, a quantity of chunks, a quantity of data areas in the chunk data area, an amount of metadata in the metadata area, and a quantity of data blocks in the data area that are shown in FIG. 2 are not limited to values shown in FIG. 2.

Each data area is corresponding to a different metadata block, and data blocks corresponding to metadata in one metadata block form one data area. That is, one data area includes data corresponding to metadata in a size of one metadata block, and a size of one data area is determined by an amount of metadata in one metadata block and a size of one data block.

In the flash, a size of one time of page write is 4K. Therefore, in a better solution, a size of one metadata block is 4 K. Assuming that a size of one piece of metadata is 32 B and a size of one data block is 16 K, a size of one data area is 2 M (16K×(4K/32B)).

It should be noted that, one chunk metadata area may include one or more metadata blocks, and a size of one chunk metadata area is variable. In a better solution, a size of one data block may be used as the size of one chunk metadata area. In this way, when the flash is loaded and initialized, a storage area of the flash may be divided according to the size of the data block. For example, if the size of one data block is 4 K, the size of one chunk metadata area is also 4 K, and there is one (4K/4K) metadata block in the chunk metadata area. For another example, if the size of one data block is 16 K, the size of one chunk metadata area is also 16 K, and there are four (16K/4K) metadata blocks in the chunk metadata area. The size of the data block may be configured by an operating system or a storage apparatus, and may be 4 K, 8 K, 16 K, 32 K, 64 K, or the like. This is not limited in this embodiment of the present invention.

Certainly, the size of the data block may be different from the size of the chunk metadata area. For example, the size of the data block may be 512 B, 1 K, 2 K, or the like, and the chunk metadata area includes at least one metadata block, and is obviously larger than the data block.

For another example, when the size of the data block is 8 K, 16 K, 32 K, 64 K, or the like, the size of the chunk metadata area may be less than the size of the data block. For example, the chunk metadata area includes only one metadata block.

Figure 3:
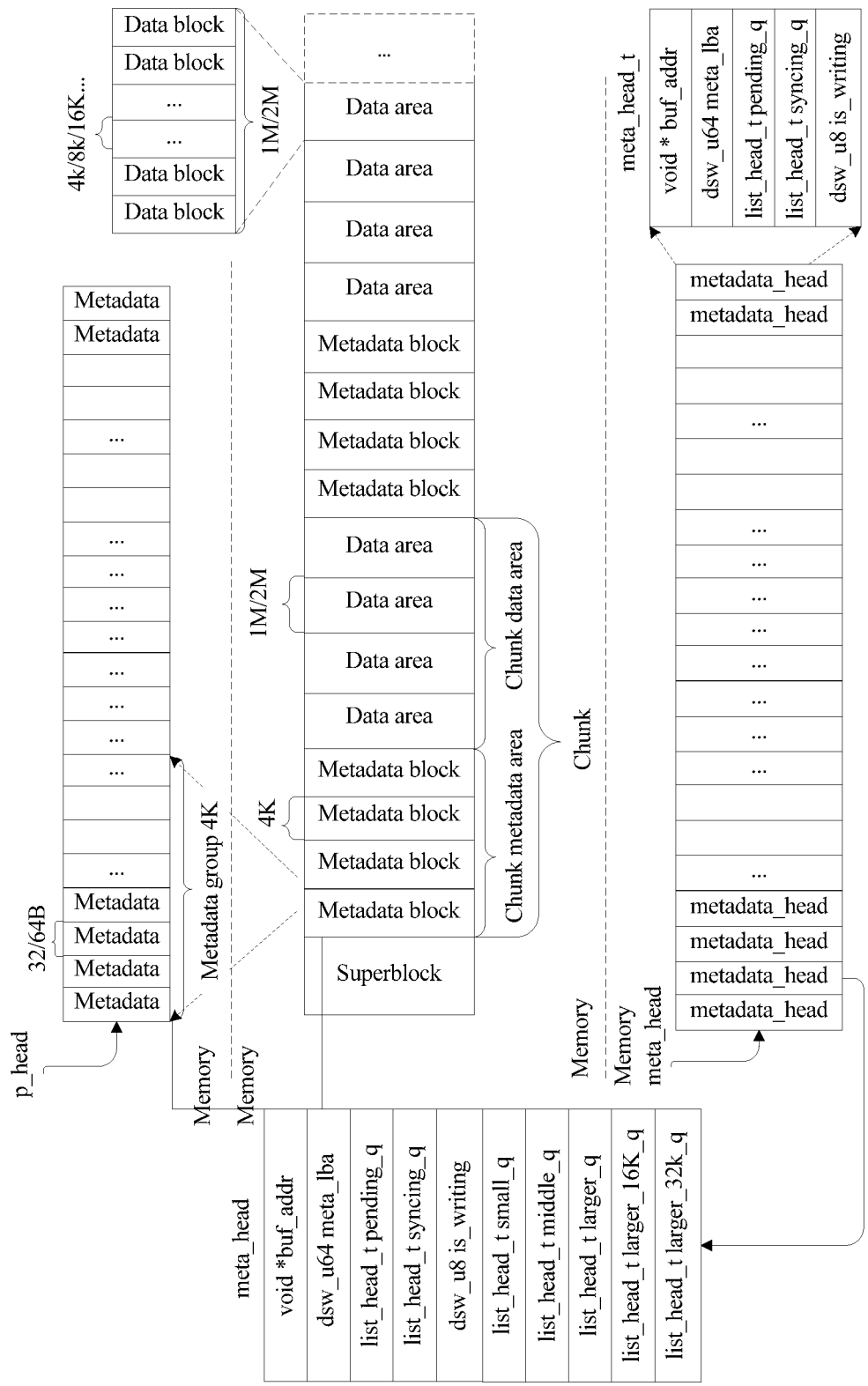
FIG. 3 is a schematic diagram of a relationship between a location of metadata in a memory and a location that is in a flash and that is actually persisted according to the present invention.

FIG. 3 is a schematic diagram of a relationship between a location of metadata in a memory and a location that is in a flash and that is actually persisted according to the present invention. In FIG. 3, a data structure, that is, a p_head array, may be designed in the memory, to store metadata corresponding to each data block in a data area. It is assumed that a size of metadata required by each data block is 64 bytes. In this case, 64 (4K/64B=64) pieces of metadata may be classified as one group in the p_head array.

A data structure wbhead_persistent of metadata corresponding to a cache block and a meaning of the data structure wbhead_persistent are shown as follows:

```
typedef struct wbhead_persistent
{
    dsw_u32 meta_crc;//a cyclic redundancy code (Cyclic Redundancy Check, CRC) check
value of metadata
    dsw_u32 data_crc;//a CRC check value of data
    dsw_u8 head_type;//a type of a cache block
    dsw_u8 disk_head_status;//a status of cache block persistence
    dsw_u8 valid_bitmap[FLASH_BITMAP_SIZE];//a bitmap is used in the cache block to
mark a current data status
    mapping_info_t mapping_info;//information about mapping between the metadata and a
data block, for example, information indicating a specific data logical block address (Logical Block
Address, LBA) managed by a cache
    ...
    ...
    ...
}wbhead_persistent_t;
```

One piece of metadata in the memory is corresponding to one element in the p_head array, and a data structure flashcache_wbhead of the metadata and a meaning of the data structure flashcache_wbhead are shown as follows:

```
typedef struct flashcache_wbhead
{
    wbhead_persistent_t persisten_info;//information about metadata that needs to be
persisted to a solid state drive (Solid State Drives, SSD)
    dsw_u8 delay_flush;//a flush policy
    dsw_u8 head_status;//a current status type of metadata
    dsw_u16 read_ref_count;//a quantity of requests that are currently being read by a
system
    ....
    ....
    ....
    array_hlist_node_t hash_node;//a cache block hangs in a node of a hash (hash) linked list
    array_list_head_t wbhead_node;
}flashcache_wbhead_t.
```

As shown in FIG. 3, a data structure, that is, a metadata_head array, may be further designed in the memory, to maintain a relationship between metadata of data in the memory and an actual storage location (that is, a corresponding metadata block) of the metadata in an actual persistence device (Flash).

One metadata group that is in the memory and that is corresponding to one piece of metadata in the flash is corresponding to one element in the metadata_head array, and a data structure metadata_head of the metadata and a meaning of the data structure metadata_head may be shown as follows:

```
typedef struct metadata_head
{
    list_head_t metadata_pending_q;//a to-be-combined data IO queue
    list_head_t metadata_syncing_q;//metadata IO queues are synchronously combined
    dsw_u64 metadata_lba;//a specific location that is in a flash card and that is of metadata
in a system is designated
    void *buf_address;//a location corresponding to 4 K in the memory is designated
    dsw_u8 is_writing;//whether a head is performing an IO operation is marked
    list_head_t small_buddy_head_q;//a queue of a buddy group including 2 to 3 cache
blocks
    list_head_t middle_buddy_q;//a queue of a buddy group including 4 to 7 cache blocks
    list_head_t larger_buddy_q;//a queue of a buddy group including 8 to 15 cache blocks
    list_head_t larger_16K_buddy_q;//a queue of a buddy group including 16 to 31 cache
blocks
    list_head_t larger_32K_buddy_q;//a queue of a buddy group including at least 32 cache
blocks
}metadata_head_t.
```

As shown in FIG. 3, the memory stores metadata information of one data block according to flashCache wbhead, and stores information about a same group of metadata (that is, one metadata block) according to metadata_head, to facilitate writing that is performed according to the metadata block.

Figure 4:
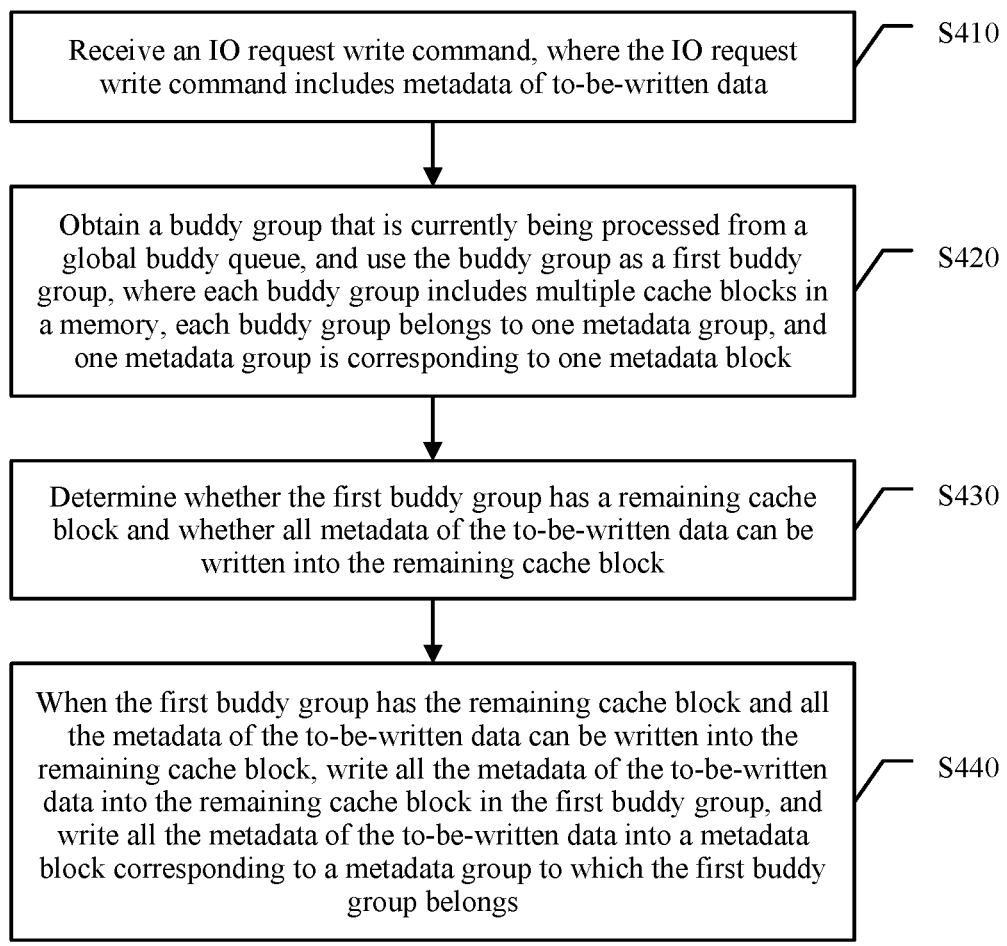
FIG. 4 is a flowchart of a method for writing data into a cache according to Embodiment 1 of the present invention.

The following describes a method in FIG. 4 with reference to FIG. 3 and data structures of metadata and a metadata block. Certainly, FIG. 4 may be applied to another data layout manner of a flash including multiple metadata areas, and this is not limited in this embodiment of the present invention.

S410. Receive an IO request write command, where the IO request write command includes metadata of to-be-written data.

Optionally, after the receiving an IO request write command, the method may further include the following steps:

determining, according to a size of the data block, whether the IO request write command needs to be split;

if the IO request write command needs to be split, splitting the IO request write command according to the size of the data block, to obtain multiple first IO request write commands; and for the multiple first IO request write commands, determining whether metadata that is of the to-be-written data and that is included in each first IO request write command is cached in a memory, and if yes, directly performing a write operation, or if no, performing a step of obtaining a buddy group that is currently being processed from a global buddy queue and using the buddy group as a first buddy group.

Specifically, a cache apparatus obtains a size of a data block in the flash in advance. For example, the obtained size of the data block may be 16 K. After the IO request write command is received, it is assumed that a size of the IO request write command is 32 K (twice the data block), and the IO request write command needs to be split. During splitting, when an offset of the IO request write command is 0, the IO request command is split into two first IO request write commands, and a size of each first IO request write command is 16 K; or when an offset of the IO request write command is not 0, the IO request command is split into three first IO request write commands. This step can ensure that a size of a data block written into the flash by the cache apparatus is consistent with the size of the data block inside the flash, so that efficiency of writing data into the flash can be improved.

It should be noted that, the step of determining whether metadata that is of the to-be-written data and that is included in the multiple first IO request write commands is cached in the memory in step S410 may be implemented with reference to the prior art, and details are not described herein in this embodiment of the present invention.

S420. Obtain a buddy group that is currently being processed from a global buddy queue, and use the buddy group as a first buddy group, where each buddy group includes multiple cache blocks in a memory, each buddy group belongs to one metadata group, and one metadata group is corresponding to one metadata block.

It should be noted that, a total size of storage space that is in the memory and that is used to store metadata corresponding to the data block may be obtained in advance, a size of metadata corresponding to the data block in the flash may be obtained, and the total size of the storage space is then divided by the size of the metadata corresponding to the data block, so that a total quantity of cache blocks in the memory can be obtained. It may be understood that a size of the cache block is the size of the metadata. In addition, the metadata group is corresponding to the metadata block in the flash, and a quantity of cache blocks included in the metadata group may be obtained through calculation according to a size of the metadata block in the flash and the size of the metadata corresponding to the data block. For example, if the size of the metadata block is 4 K, and the size of the metadata corresponding to the data block is 32 B, the metadata group manages 4K/32B=128 cache blocks, that is, one metadata group of 4 K may include 128 cache blocks. Optionally, the cache blocks included in the metadata group are successively arranged according to addresses. Each cache block is used to store the metadata of the to-be-written data. It should be noted herein that, a size of the metadata of the to-be-written data is consistent with the size of the metadata corresponding to the data block in the flash, and sizes in a system are all configurable.

Initially, the cache blocks included in the metadata group may be grouped. For example, 64 cache blocks are classified as one group in sequence according to an address range of the metadata, and the group of cache blocks form one buddy group, that is, addresses of cache blocks included in one buddy group are successive.

Specifically, the buddy group may be managed by using a multilevel queue. In this embodiment, two multilevel queues may be created, one is the global buddy queue, and the other is a buddy queue of the metadata group. The buddy queue of the metadata group is used to record a buddy group included in the metadata group, and the global buddy queue is used to record buddy groups included in all metadata groups.

Figure 5:
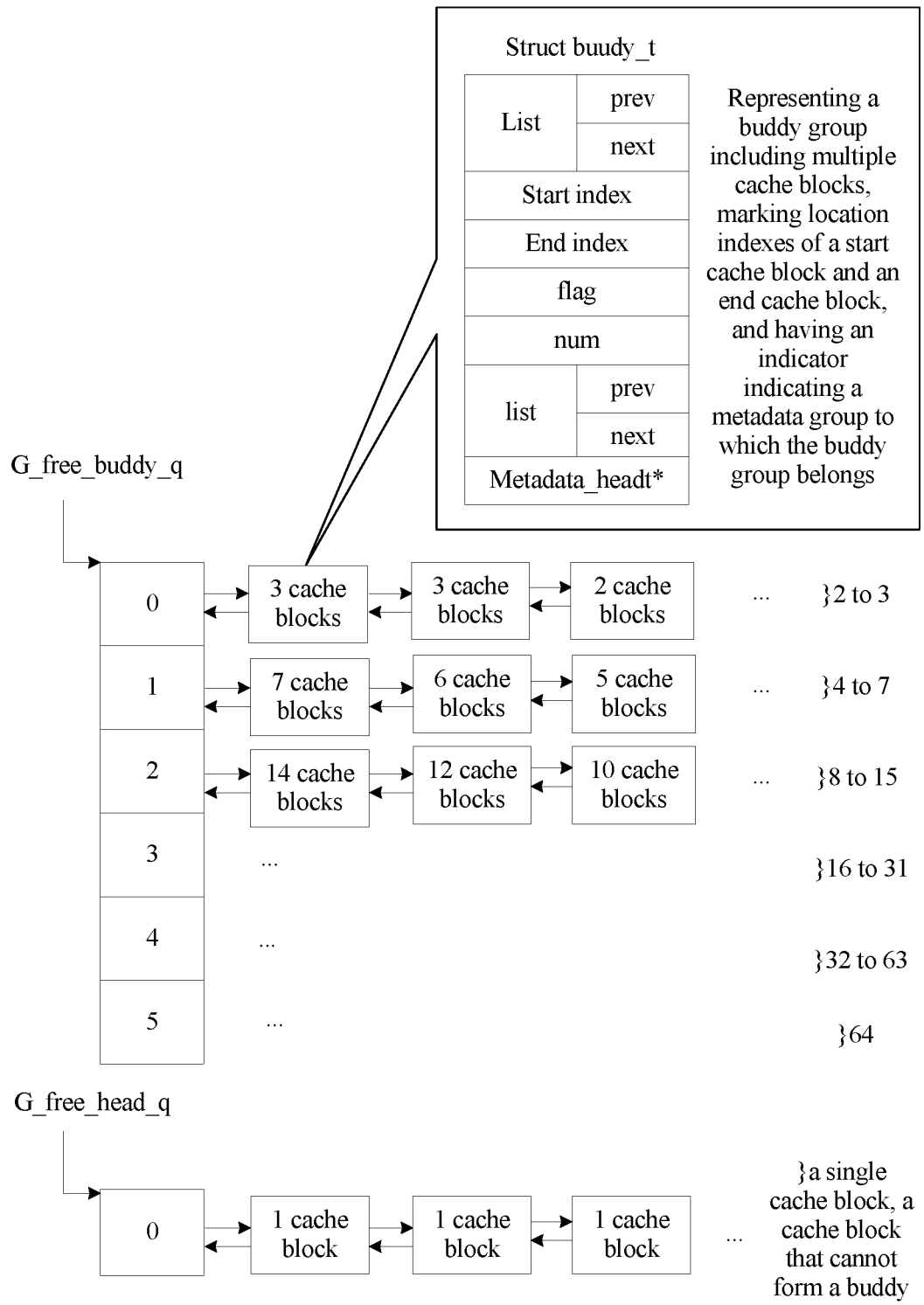
FIG. 5 is a schematic diagram of a relationship between a global buddy queue and a buddy group.

Referring to FIG. 5, FIG. 5 is a schematic diagram of a relationship between a global buddy queue G_free_buddy_q and a buddy group. In FIG. 5, a data structure multi_q_node of the global buddy queue and a meaning of the data structure multi_q_node are shown as follows:

```
typedef struct multi_q_node
{
    dsw_u32 total_cnt;//a total quantity of cache blocks that may be recorded in each level of queue in a multilevel queue
    list_head_t invalid_q;//a queue of a remaining cache block
}multi_q_node_t;
```

A data structure invalid_q_type of a type of each queue in the global buddy queue and a meaning of the data structure invalid_q_type are shown as follows:

```
enum invalid_q_type
{
SMALLER_BUDDY_Q=0,//a queue of a buddy group including 2 to 3 cache blocks
MIDDLE_BUDDY_Q,//a queue of a buddy group including 4 to 7 cache blocks
LARGER_BUDDY_Q,//a queue of a buddy group including 8 to 15 cache blocks
LARGER_16_BUDDY_Q,//a queue of a buddy group including 16 to 31 cache blocks
LARGER_32_BUDDY_Q,//a queue of a buddy group including at least 32 cache blocks
INVALID_BUDDY_Q_TYPE_NUM
}.
```

A data structure block_buddy of a buddy group in each queue and a meaning of the data structure block_buddy are shown as follows:

```
typedef struct block_buddy
{
    dsw_u32 start;//a buddy group, and a start location of a remaining cache block
    dsw_u32 end;//a buddy group, and an end location of the remaining cache block
    dsw_int flag; //to mark a multilevel queue to which the current buddy group belongs
```

```
    dsw_int num;//a quantity of successive remaining cache blocks in the buddy group
    list_head_t node;//to hang in a corresponding location in the multilevel queue according
to a rank of FLAG
    list_head_t metadata_head_node;//to hang in a corresponding location in a
metadata_head4K queue according to a rank of FLAG, so as to mainly resolve a metadata
combination problem
    metadata_head_t *p_metadata_head;//indicating a metadata head of 4 K to which a head
of the current buddy group belongs
    dsw_u64 reserved;
}block_buddy_t;
```

That is, after the cache blocks included in the metadata group are initially grouped, each buddy group needs to be hung in the global buddy queue according to a quantity of cache blocks included in each buddy group, and the buddy group needs to be hung in a buddy queue of a metadata group to which the buddy group belongs.

It should be noted that, it may be learned according to the data structure invalid_q_type of the type of the queue that types of queues in the global buddy queue are different. For example, a queue 0 records only a buddy group including 2 or 3 cache blocks, a queue 1 records only a buddy group including 4 to 7 cache blocks, and so on. Therefore, if a buddy group includes four cache blocks, the buddy group is recorded in the queue 1.

Specifically, referring to FIG. 5, the global buddy queue includes six queues. When multiple buddy groups are recorded in any queue, the buddy groups are arranged in sequence according to quantities of remaining cache blocks included in the buddy groups. Specifically, the buddy groups may be arranged in descending order according to the quantities of remaining cache blocks included in the buddy groups.

Herein, it should be noted that, the cache apparatus uses, as the first buddy group, the buddy group that is currently being processed and that is in the global buddy queue. It may be understood that, when the cache apparatus starts to process another buddy group in the global buddy queue after processing the first buddy group, the another buddy group is used as the first buddy group.

S430. Determine whether the first buddy group has a remaining cache block and whether all metadata of the to-be-written data can be written into the remaining cache block.

It should be noted herein that, because the cache block is used to store the metadata of the to-be-written data, after the cache apparatus processes multiple IO request write commands, a quantity of cache blocks in the first buddy group is correspondingly reduced. In the foregoing example, one buddy group may include 64 cache blocks, and when the cache apparatus writes 64 pieces of metadata into the buddy group, the buddy group has no remaining cache block. Therefore, each time the cache apparatus writes metadata into a remaining cache block, the cache apparatus needs to determine whether the first buddy group has a remaining cache block and whether the first buddy group has enough remaining cache blocks into which all metadata included in a current IO request write command can be written. For example, when there are three pieces of to-be-written metadata currently, but the first buddy group has only two remaining cache blocks, all the metadata cannot be written into the remaining cache blocks in the first buddy group.

S440. When the first buddy group has the remaining cache block and all the metadata of the to-be-written data can be written into the remaining cache block, write all the metadata of the to-be-written data into the remaining cache block in the first buddy group, and write all the metadata of the to-be-written data into a metadata block corresponding to a metadata group to which the first buddy group belongs.

It should be noted that, a metadata block that is in the flash and that is corresponding to the metadata group may be obtained according to metadata_head corresponding to the metadata group to which the first buddy group belongs, and the metadata of the to-be-written data may be written into the metadata block.

After all the metadata of the to-be-written data is written into the remaining cache block in the first buddy group, a quantity of remaining cache blocks in the first buddy group may be updated, a location of the first buddy group in the global buddy queue may be adjusted according to a current quantity of remaining cache blocks in the first buddy group, and a location of the first buddy group in a buddy queue of the metadata group to which the first buddy group belongs may be adjusted.

Optionally, before the writing the metadata of the to-be-written data into the metadata block corresponding to the metadata group, the method may further include the following steps.

The cache apparatus determines whether all the first IO request write commands have been processed, and if not all the first IO request write commands have been processed, the cache apparatus continues to perform processing in S420 to S440 on another first IO request write command, or if all the first IO request write commands have been processed, the cache apparatus determines whether these IO request write commands can be combined, and if the IO request write commands can be combined, the cache apparatus writes data into the flash according to a combined JO request command. In the present invention, the remaining cache block is preferentially obtained from the first buddy group each time. Because addresses of remaining cache blocks obtained from a same buddy group are successive, a probability of combining the IO request write commands can be increased, so as to reduce times of writing data into the flash.

It should be noted that, determining whether the IO request write commands can be combined may be implemented with reference to the prior art, and details are not described herein.

Further, when the first buddy group has no remaining cache block or all the metadata of the to-be-written data cannot be written into the remaining cache block, it is determined whether a buddy queue of the metadata group to which the first buddy group belongs has a second buddy group in which all the metadata of the to-be-written data can be written into a remaining cache block, and if the buddy queue has the second buddy group, the second buddy group is obtained from the buddy queue of the metadata group to which the first buddy group belongs.

A main objective of the foregoing step is as follows: When the first buddy group has no remaining cache block or does not have enough remaining cache blocks, the second buddy group belonging to a same metadata group as the first buddy group is found as soon as possible, so as to write all the metadata into the second buddy group. Because addresses of cache blocks included in a same metadata group are also successive, the probability of combining the IO request write commands can be further increased, so as to reduce the times of writing data into the flash.

A buddy group included in the metadata group is recorded in the buddy queue of the metadata group, and types of queues in the buddy queue of the metadata group are different. Like the global buddy queue, a queue 0 records only a buddy group including 2 or 3 cache blocks, a queue 1 records only a buddy group including 4 to 7 cache blocks, and so on. Similarly, when multiple buddy groups are recorded in any queue in the buddy queue of the metadata group, the buddy groups are arranged in sequence according to quantities of remaining cache blocks included in the buddy groups. Specifically, the buddy groups may be arranged in descending order according to the quantities of remaining cache blocks included in the buddy groups. Therefore, when the second buddy group is obtained from the buddy queue of the metadata group, a second buddy group that includes remaining cache blocks whose quantity is the closest to a quantity of cache blocks that are currently required may be obtained.

After the second buddy group is obtained, all the metadata of the to-be-written data is written into the remaining cache block in the second buddy group, and all the metadata of the to-be-written data is written into a metadata block corresponding to a metadata group to which the second buddy group belongs. The global buddy queue includes buddy groups included in buddy queues of all metadata groups.

After all the metadata of the to-be-written data is written into the remaining cache block in the second buddy group, a quantity of remaining cache blocks in the second buddy group may be updated, a location of the second buddy group in the global buddy queue may be adjusted according to a current quantity of remaining cache blocks in the second buddy group, and a location of the second buddy group in a buddy queue of the metadata group to which the second buddy group belongs may be adjusted.

Optionally, before the writing all the metadata of the to-be-written data into the remaining cache block in the second buddy group, the method may further include: The cache apparatus determines whether all first IO request write commands have been processed, and if not all the first IO request write commands have been processed, the cache apparatus continues to process another first IO request write command, or if all the first IO request write commands have been processed, the cache apparatus determines whether these IO request write commands can be combined, and if the IO request write commands can be combined, the cache apparatus writes data into the flash according to a combined IO request write command.

Further, when the buddy queue of the metadata group to which the first buddy group belongs has no second buddy group in which all the metadata of the to-be-written data can be written into a remaining cache block, it is determined whether the global buddy queue has a third buddy group in which all the metadata of the to-be-written data can be written into a remaining cache block, and if the global buddy queue has the third buddy group, the third buddy group is obtained from the global buddy queue, all the metadata of the to-be-written data is written into the remaining cache block in the third buddy group, and all the metadata of the to-be-written data is written into a metadata block corresponding to a metadata group to which the third buddy group belongs.

That is, when there is no appropriate second buddy group, the third buddy group into which all the metadata of the to-be-written data can be written is obtained from the global buddy queue. Specifically, a third buddy group that includes remaining cache blocks whose quantity is the closest to the quantity of cache blocks that are currently required may be obtained from the global buddy queue. The third buddy group and the first buddy group do not belong to a same metadata group, but all the metadata can be written into the third buddy group. After the writing is completed, a quantity of remaining cache blocks in the third buddy group also needs to be updated, and a location of the third buddy group in the global buddy queue and a location of the third buddy group in the buddy queue of the metadata group need to be adjusted.

When the global buddy queue has no third buddy group into which all the metadata of the to-be-written data can be written, multiple buddy groups may be simultaneously obtained from the global buddy queue according to the quantity of cache blocks that are currently required, and all the metadata may be separately written into the obtained multiple buddy groups. After the writing is completed, a quantity of remaining cache blocks in each of the multiple buddy groups needs to be updated, and a location that is of each of the multiple buddy groups and that is in the global buddy queue and a location that is of each of the multiple buddy groups and that is in the buddy queue of the metadata group need to be adjusted.

In addition, a global single cache queue (for example, G_free_head_q in FIG. 5) and a single cache queue of the metadata group may be further created. The single cache queue of the metadata group is used to record a single cache block that is in the metadata group and that cannot form a buddy group with another cache block, and the global single cache queue is used to record single cache blocks included in all the metadata groups.

When the global buddy queue has no third buddy group in which all the metadata of the to-be-written data can be written into a remaining cache block, a single remaining cache block into which all the metadata of the to-be-written data can be written may be further obtained from the global single cache queue, and all the metadata of the to-be-written data is written into the obtained remaining cache block in the global single cache queue. Remaining cache blocks included in the global single cache queue may belong to different metadata groups, and therefore, all the metadata of the to-be-written data needs to be correspondingly written into a metadata block corresponding to a metadata group to which the remaining cache block in the global single cache queue belongs.

It should be noted that, when the global single cache queue does not have enough remaining cache blocks into which all the metadata of the to-be-written data can be written, the cache apparatus may not process the IO request write command, and adds the IO request write command to a waiting queue. When the global buddy queue has enough remaining cache blocks, the cache apparatus processes the IO request write command.

For the remaining cache block obtained by using the foregoing method, when metadata written into the cache block is invalid metadata, the cache apparatus needs to recycle the cache block to the memory. The step of recycling the cache block may include:

receiving a metadata recycling instruction, where the metadata recycling instruction includes an address of a cache block to which to-be-recycled metadata belongs;

obtaining a former cache block and a latter cache block of the cache block according to the address of the cache block;

combining the cache block with an idle-state cache block in the former cache block and the latter cache block into a new buddy group; and adding the new buddy group to the global buddy queue and a buddy queue of the metadata group according to a quantity of cache blocks included in the new buddy group.

Specifically, if the idle-state cache block in the former cache block and the latter cache block belongs to a buddy group, the new buddy group includes the cache block and a cache block that is included in the buddy group to which the idle-state cache block in the former cache block and the latter cache block belongs. For example, if the former cache block of the cache block is in a single idle state, and the latter cache block of the cache block is in an idle state, but the latter cache block belongs to a buddy group, the former cache block, the cache block, and a cache block included in the buddy group to which the latter cache block belongs are combined into a new buddy group. In addition, the buddy group to which the latter cache block belongs needs to be deleted from the global buddy queue and the buddy queue of the metadata group, and the former cache block needs to be deleted from the global single cache queue and the single cache queue of the metadata group.

In addition, if neither the former cache block nor the latter cache block is in an idle state, the cache block is added to the global single cache queue and the single cache queue of the metadata group.

According to the foregoing step of recycling the cache block, the recycled cache block may be recycled to a buddy queue of a metadata group to which the recycled cache block belongs and the global buddy queue, so that a problem of a cache block fragment is resolved. Therefore, in the method of the present invention, when remaining cache blocks are obtained, it can be ensured that addresses of the obtained remaining cache blocks are successive, so that a probability of combining the metadata can be increased, to resolve a problem that a lifetime of the flash is affected because metadata is frequently written into the flash.

In the method according to this embodiment of the present invention, the probability of combining the metadata is significantly increased by performing metadata management in combination with metadata combination. Therefore, metadata IO can be greatly reduced, and this plays an important role in improving system performance. In addition, IO write times are reduced, operation IO caused by the metadata is greatly reduced, and this plays an important role in prolonging a lifetime of the flash card.

Locations, in a physical card, of cache blocks allocated to IO of a large block are as successive as possible by means of metadata management. Therefore, several IO can be written in a combined manner by using a WriteV interface. In a scenario of a large block, IO times can be greatly reduced, and utilization of a CPU of the system can be significantly reduced. In an actual test, in the scenario of a large block, the utilization of the CPU can be reduced by 20% to 30%.

When idle blocks are allocated, physical locations of IO are as successive as possible, and therefore, during flushing, in the scenario of a large block or a scenario of ordered IO, a read combination effect is greatly magnified, a large quantity of IO read requests can be reduced, and the utilization of the CPU is significantly reduced.

Figure 6:
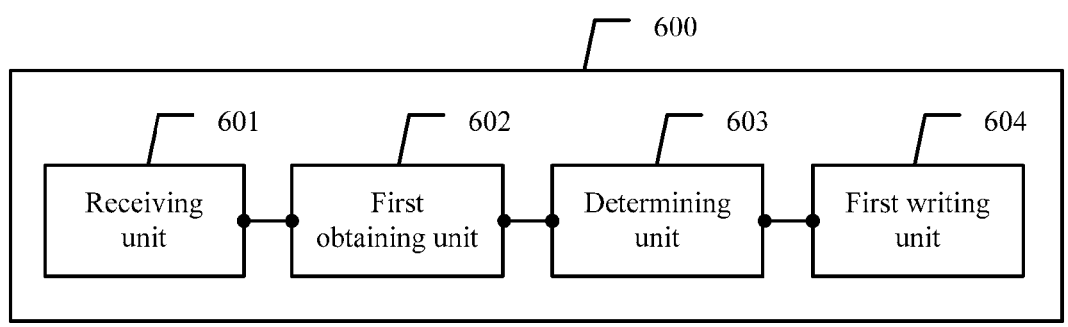
FIG. 6 is a schematic diagram of an apparatus for writing data into a cache according to Embodiment 2 of the present invention.

FIG. 6 is a schematic diagram of an apparatus for writing data into a cache according to Embodiment 2 of the present invention. The apparatus is configured to perform the method in FIG. 4. In FIG. 6, a storage area of a flash of the apparatus includes multiple chunks, one chunk includes one chunk metadata area and one chunk data area, the chunk metadata area includes at least one metadata block, the chunk data area includes at least one data area corresponding to the at least one metadata block, the metadata block includes multiple pieces of metadata, the data area includes multiple data blocks, the metadata block is in a one-to-one correspondence with the data area, and the metadata is in a one-to-one correspondence with the data block. The apparatus includes a receiving unit 601, a first obtaining unit 602, a determining unit 603, and a first writing unit 604.

The receiving unit 601 is configured to receive an IO request write command, where the IO request write command includes metadata of to-be-written data.

The first obtaining unit 602 is configured to: obtain a buddy group that is currently being processed from a global buddy queue, and use the buddy group as a first buddy group. Each buddy group includes multiple cache blocks in a memory, each buddy group belongs to one metadata group, and one metadata group is corresponding to one metadata block.

The determining unit 603 is configured to determine whether the first buddy group has a remaining cache block and whether all metadata of the to-be-written data can be written into the remaining cache block.

The first writing unit 604 is configured to: when the first buddy group has the remaining cache block and all the metadata of the to-be-written data can be written into the remaining cache block, write all the metadata of the to-be-written data into the remaining cache block in the first buddy group, and write all the metadata of the to-be-written data into a metadata block corresponding to a metadata group to which the first buddy group belongs.

Optionally, the apparatus further includes:

a second obtaining unit 605, configured to: when the determining unit determines that the first buddy group has no remaining cache block or all the metadata of the to-be-written data cannot be written into the remaining cache block, determine whether a buddy queue of the metadata group to which the first buddy group belongs has a second buddy group in which all the metadata of the to-be-written data can be written into a remaining cache block, and if the buddy queue has the second buddy group, obtain the second buddy group from the buddy queue of the metadata group to which the first buddy group belongs; and a second writing unit 606, configured to: write all the metadata of the to-be-written data into the remaining cache block in the second buddy group, and write all the metadata of the to-be-written data into a metadata block corresponding to a metadata group to which the second buddy group belongs, where the global buddy queue includes buddy groups included in buddy queues of all metadata groups.

Optionally, the apparatus further includes:

a third obtaining unit 607, configured to: when the determining unit 603 determines that the buddy queue of the metadata group to which the first buddy group belongs has no second buddy group in which all the metadata of the to-be-written data can be written into a remaining cache block, determine whether the global buddy queue has a third buddy group in which all the metadata of the to-be-written data can be written into a remaining cache block, and if the global buddy queue has the third buddy group, obtain the third buddy group from the global buddy queue; and a third writing unit 608, configured to: write all the metadata of the to-be-written data into the remaining cache block in the third buddy group, and write all the metadata of the to-be-written data into a metadata block corresponding to a metadata group to which the third buddy group belongs.

Optionally, the apparatus further includes:

a fourth obtaining unit 609, configured to: when the determining unit 603 determines that the global buddy queue has no third buddy group in which all the metadata of the to-be-written data can be written into a remaining cache block, determine whether a global single cache queue has enough remaining cache blocks into which all the metadata of the to-be-written data can be written, and if the global single cache queue has enough remaining cache blocks, obtain, from the global single cache queue, the remaining cache blocks into which all the metadata of the to-be-written data can be written; and a fourth writing unit 610, configured to: write all the metadata of the to-be-written data into the obtained remaining cache blocks in the global single cache queue, and correspondingly write all the metadata of the to-be-written data into metadata blocks corresponding to metadata groups to which the remaining cache blocks in the global single cache queue belong, where the global single cache queue includes single cache blocks that are included in single cache queues of all metadata groups and that cannot form a buddy group with another cache block.

Optionally, the cache blocks included in each buddy group are successively arranged according to addresses.

Optionally, a quantity of remaining cache blocks included in each buddy group is recorded in both the global buddy queue and a buddy queue of the metadata group, and a quantity of remaining cache blocks that is recorded in the global buddy queue is different from a quantity of remaining cache blocks that is recorded in a buddy queue of each metadata group.

Optionally, the determining unit 603 is further configured to determine, according to a size of the data block, whether the IO request write command needs to be split.

The apparatus further includes a split unit 611, configured to: when the determining unit 603 determines that the IO request write command needs to be split, split the IO request write command according to the size of the data block, to obtain multiple first IO request write commands.

The determining unit 603 is further configured to: for the multiple first IO request write commands, determine whether metadata that is of the to-be-written data and that is included in each first IO request write command is cached in the memory, and if yes, directly perform a write operation, or if no, perform the step of obtaining a buddy group that is currently being processed from a global buddy queue and using the buddy group as a first buddy group.

Optionally, the apparatus further includes an arrangement unit 612, configured to: when multiple buddy groups are recorded in any queue in the global buddy queue, arrange the multiple buddy groups according to a quantity of remaining cache blocks included in each buddy group; and/or when multiple buddy groups are recorded in any queue in a buddy queue of the metadata group, arrange the multiple buddy groups according to a quantity of remaining cache blocks included in each buddy group.

Optionally, the receiving unit 601 is further configured to receive a metadata recycling instruction, where the metadata recycling instruction includes an index of a cache block to which to-be-recycled metadata belongs.

The apparatus further includes:

a fifth obtaining unit 613, configured to obtain a former cache block and a latter cache block of the cache block according to the index of the cache block; and an adding unit 614, configured to: combine the cache block with an idle-state cache block in the former cache block and the latter cache block into a new buddy group, and add the new buddy group to the global buddy queue and a buddy queue of the metadata group according to a quantity of cache blocks included in the new buddy group.

Optionally, if the idle-state cache block in the former cache block and the latter cache block belongs to a buddy group, the new buddy group includes the cache block and a cache block that is included in the buddy group to which the idle-state cache block in the former cache block and the latter cache block belongs.

Optionally, the adding unit 614 is further configured to: when neither the former cache block nor the latter cache block is in an idle state, add the cache block to a global single cache queue and a single cache queue of the metadata group.

The apparatus for writing data into a cache according to this embodiment of the present invention records the remaining cache block in the memory by using the buddy group, and when receiving the IO request write command, the apparatus obtains remaining cache blocks from the buddy group, and writes, into the remaining cache blocks obtained from a same buddy group, all the metadata of the to-be-written data that is included in the IO request write command, so as to increase a probability of combining the metadata and further resolve a problem that a lifetime of the flash is affected by write amplification caused because the metadata is frequently written into the flash.

Figure 7:
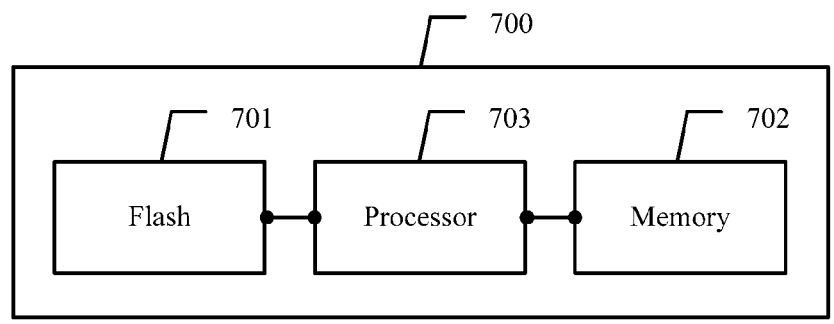
FIG. 7 is a schematic structural diagram of an all-in-one machine for computing and storage according to an embodiment of the present invention.

Correspondingly, an embodiment of the present invention further provides an all-in-one machine for computing and storage. As shown in FIG. 7, the all-in-one machine includes a cache that uses a flash 701 (only the flash 701 is shown in the figure), a memory 702, and a processor 703.

A storage area of the flash 701 includes multiple chunks, one chunk includes one chunk metadata area and one chunk data area, the chunk metadata area includes at least one metadata block, the chunk data area includes at least one data area corresponding to the at least one metadata block, the metadata block includes multiple pieces of metadata, the data area includes multiple data blocks, the metadata block is in a one-to-one correspondence with the data area, and the metadata is in a one-to-one correspondence with the data block.

The processor 703 receives an IO request write command, where the IO request write command includes metadata of to-be-written data.

The processor 703 obtains a buddy group that is currently being processed from a global buddy queue, and uses the buddy group as a first buddy group. Each buddy group includes multiple cache blocks in the memory 702, each buddy group belongs to one metadata group, and one metadata group is corresponding to one metadata block.

The processor 703 determines whether the first buddy group has a remaining cache block and whether all metadata of the to-be-written data can be written into the remaining cache block.

When the first buddy group has the remaining cache block and all the metadata of the to-be-written data can be written into the remaining cache block, the processor 703 writes all the metadata of the to-be-written data into the remaining cache block in the first buddy group, and writes all the metadata of the to-be-written data into a metadata block corresponding to a metadata group to which the first buddy group belongs.

Further, when the first buddy group has no remaining cache block or all the metadata of the to-be-written data cannot be written into the remaining cache block, the processor 703 determines whether a buddy queue of the metadata group to which the first buddy group belongs has a second buddy group in which all the metadata of the to-be-written data can be written into a remaining cache block, and if the buddy queue has the second buddy group, obtains the second buddy group from the buddy queue of the metadata group to which the first buddy group belongs.

The processor 703 writes all the metadata of the to-be-written data into the remaining cache block in the second buddy group, and writes all the metadata of the to-be-written data into a metadata block corresponding to a metadata group to which the second buddy group belongs. The global buddy queue includes buddy groups included in buddy queues of all metadata groups.

Further, when the buddy queue of the metadata group to which the first buddy group belongs has no second buddy group in which all the metadata of the to-be-written data can be written into a remaining cache block, the processor 703 determines whether the global buddy queue has a third buddy group in which all the metadata of the to-be-written data can be written into a remaining cache block, and if the global buddy queue has the third buddy group, obtains the third buddy group from the global buddy queue.

The processor 703 writes all the metadata of the to-be-written data into the remaining cache block in the third buddy group, and writes all the metadata of the to-be-written data into a metadata block corresponding to a metadata group to which the third buddy group belongs.

Further, when the global buddy queue has no third buddy group in which all the metadata of the to-be-written data can be written into a remaining cache block, the processor 703 determines whether a global single cache queue has enough remaining cache blocks into which all the metadata of the to-be-written data can be written, and if the global single cache queue has enough remaining cache blocks, obtains, from the global single cache queue, the remaining cache blocks into which all the metadata of the to-be-written data can be written.

The processor 703 writes all the metadata of the to-be-written data into the obtained remaining cache blocks in the global single cache queue, and correspondingly writes all the metadata of the to-be-written data into metadata blocks corresponding to metadata groups to which the remaining cache blocks in the global single cache queue belong. The global single cache queue includes single cache blocks that are included in single cache queues of all metadata groups and that cannot form a buddy group with another cache block.

Further, the cache blocks included in each buddy group are successively arranged according to addresses.

Further, a quantity of remaining cache blocks included in each buddy group is recorded in both the global buddy queue and a buddy queue of the metadata group, and a quantity of remaining cache blocks that is recorded in the global buddy queue is different from a quantity of remaining cache blocks that is recorded in a buddy queue of each metadata group.

Further, after the processor 703 receives the IO request write command, and before the processor 703 obtains the buddy group that is currently being processed from the global buddy queue, and uses the buddy group as the first buddy group, the processor 703 determines, according to a size of the data block, whether the IO request write command needs to be split.

If the IO request write command needs to be split, the processor 703 splits the IO request write command according to the size of the data block, to obtain multiple first IO request write commands.

For the multiple first IO request write commands, the processor 703 determines whether metadata that is of the to-be-written data and that is included in each first IO request write command is cached in the memory, and if yes, directly performs a write operation, or if no, performs the step of obtaining a buddy group that is currently being processed from a global buddy queue and using the buddy group as a first buddy group.

Further, when multiple buddy groups are recorded in any queue in the global buddy queue, the processor 703 arranges the multiple buddy groups according to a quantity of remaining cache blocks included in each buddy group; and/or when multiple buddy groups are recorded in any queue in a buddy queue of the metadata group, the processor 703 arranges the multiple buddy groups according to a quantity of remaining cache blocks included in each buddy group.

Further, the processor 703 receives a metadata recycling instruction, where the metadata recycling instruction includes an index of a cache block to which to-be-recycled metadata belongs; obtains a former cache block and a latter cache block of the cache block according to the index of the cache block; and combines the cache block with an idle-state cache block in the former cache block and the latter cache block into a new buddy group, and adds the new buddy group to the global buddy queue and a buddy queue of the metadata group according to a quantity of cache blocks included in the new buddy group.

Further, if the idle-state cache block in the former cache block and the latter cache block belongs to a buddy group, the new buddy group includes the cache block and a cache block that is included in the buddy group to which the idle-state cache block in the former cache block and the latter cache block belongs.

Further, when neither the former cache block nor the latter cache block is in an idle state, the processor 703 adds the cache block to the global single cache queue and the single cache queue of the metadata group.

The all-in-one machine for computing and storage according to this embodiment of the present invention records the remaining cache block in the memory by using the buddy group, and when receiving the IO request write command, the all-in-one machine obtains remaining cache blocks from the buddy group, and writes, into the remaining cache blocks obtained from a same buddy group, all the metadata of the to-be-written data that is included in the IO request write command, so as to increase a probability of combining the metadata and further resolve a problem that a lifetime of the flash is affected by write amplification caused because the metadata is frequently written into the flash.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementations, the objective, technical solutions, and benefits of the present invention are further described in detail. It should be understood that the foregoing descriptions are merely specific implementations of the present invention, but are not intended to limit the protection scope of the present invention. Any modification, equivalent replacement, or improvement made without departing from the spirit and principle of the present invention should fall within the protection scope of the present invention.

What is claimed is:

1. A method for writing data into a cache, wherein a storage area of a flash corresponding to the cache comprises multiple flash chunks, wherein one flash chunk comprises one chunk metadata area and one chunk data area, wherein the chunk metadata area comprises at least one metadata block, wherein the chunk data area comprises at least one data area corresponding to the at least one metadata block, wherein the metadata block comprises multiple pieces of metadata, wherein the data area comprises multiple data blocks, wherein the metadata block is in a one-to-one correspondence with the data area, and wherein the metadata is in a one-to-one correspondence with the data block, the method comprising:
    receiving an TO request write command, wherein the TO request write command comprises metadata of to-be-written data;
    obtaining a buddy group that is currently being processed from a global buddy queue, and using the obtained buddy group as a first buddy group, wherein the global buddy queue comprises one or more metadata groups, wherein each of the one or more metadata groups is corresponding to one metadata block of the flash and comprises one or more buddy groups, wherein each of the one or more buddy groups comprises multiple cache blocks in a memory such that addresses of cache blocks included in one buddy group are successive, wherein each of the multiple cache blocks is configured to store a piece of metadata;
    determining whether the first buddy group has one or more remaining cache blocks and whether all metadata of the to-be-written data can be written into the one or more remaining cache blocks; and
    in response to determining that the first buddy group has the one or more remaining cache blocks and that all the metadata of the to-be-written data can be written into the one or more remaining cache blocks:
        writing all the metadata of the to-be-written data into the one or more remaining cache blocks in the first buddy group; and
        writing all the metadata of the to-be-written data into a metadata block corresponding to a metadata group to which the first buddy group belongs.

2. The method according to claim 1, the method further comprising:
    in response to determining that the first buddy group has no remaining cache blocks or that all the metadata of the to-be-written data cannot be written into the remaining cache blocks, determining whether a buddy queue of the metadata group to which the first buddy group belongs has a second buddy group having one or more remaining cache blocks and whether all the metadata of the to-be-written data can be written into the one or more remaining cache blocks of the second buddy group; and
    in response to determining that the buddy queue of the metadata group to which the first buddy group belongs has the second buddy group having one or more remaining cache blocks and that all the metadata of the to-be-written data can be written into the one or more remaining cache blocks of the second buddy group:
        obtaining the second buddy group from the buddy queue of the metadata group to which the first buddy group belongs;
        writing all the metadata of the to-be-written data into the one or more remaining cache blocks in the second buddy group; and
        writing all the metadata of the to-be-written data into a metadata block corresponding to the metadata group to which the second buddy group belongs; and
    wherein the global buddy queue comprises buddy groups in buddy queues of all metadata groups.

3. The method according to claim 2, the method further comprising:
    in response to determining that the buddy queue of the metadata group to which the first buddy group belongs has no second buddy group in which all the metadata of the to-be-written data can be written into one or more remaining cache blocks of the second buddy group, determining whether the global buddy queue has a third buddy group in which all the metadata of the to-be-written data can be written into one or more remaining cache blocks of the third buddy group, wherein the third buddy group belongs to a different metadata group from the metadata group of the first buddy group; and
    in response to determining that the global buddy queue has the third buddy group in which all the metadata of the to-be-written data can be written into one or more remaining cache blocks of the third buddy group:
        obtaining the third buddy group from the global buddy queue;
        writing all the metadata of the to-be-written data into the one or more remaining cache blocks in the third buddy group; and
        writing all the metadata of the to-be-written data into a metadata block corresponding to a metadata group to which the third buddy group belongs.

4. The method according to claim 3, the method further comprising:
    in response to determining that the global buddy queue has no third buddy group in which all the metadata of the to-be-written data can be written into a remaining cache block, determining whether a global single cache queue has enough remaining cache blocks into which all the metadata of the to-be-written data can be written; and in response to determining that the global single cache queue has enough remaining cache blocks:

obtaining the remaining cache blocks into which all the metadata of the to-be-written data can be written from the global single cache queue;

writing all the metadata of the to-be-written data into the obtained remaining cache blocks in the global single cache queue; and writing all the metadata of the to-be-written data into metadata blocks corresponding to metadata groups to which the remaining cache blocks in the global single cache queue belong; and wherein the global single cache queue comprises single cache blocks that are comprised in single cache queues of all metadata groups and that cannot form a buddy group with another cache block.

5. The method according to claim 1, wherein the cache blocks comprised in each buddy group are successively arranged according to addresses.

6. The method according to claim 1, wherein a quantity of remaining cache blocks comprised in each buddy group is recorded in both the global buddy queue and a buddy queue of the metadata group, and wherein a quantity of remaining cache blocks that is recorded in the global buddy queue is different from a quantity of remaining cache blocks that is recorded in a buddy queue of each metadata group.

7. The method according to claim 1, wherein after the receiving the IO request write command, and before the obtaining a buddy group that is currently being processed from a global buddy queue and using the buddy group as a first buddy group, the method further comprises:

determining, according to a size of the data block, whether the IO request write command needs to be split;

in response to determining that the IO request write command needs to be split, splitting the IO request write command according to the size of the data block to obtain multiple first IO request write commands; and for the multiple first IO request write commands:

determining whether metadata that is of the to-be-written data and that is comprised in each first IO request write command is cached in the memory;

in response to determining that the metadata is cached in the memory, directly performing a write operation; and in response to determining that the metadata is not cached in memory, obtaining a buddy group that is currently being processed from a global buddy queue and using the buddy group as a first buddy group.

8. The method according to claim 1, wherein at least one of:

when multiple buddy groups are recorded in any queue in the global buddy queue, the multiple buddy groups are arranged according to a quantity of remaining cache blocks comprised in each buddy group; and when multiple buddy groups are recorded in any queue in a buddy queue of the metadata group, the multiple buddy groups are arranged according to a quantity of remaining cache blocks comprised in each buddy group.

9. The method according to claim 1, the method further comprising:

receiving a metadata recycling instruction, wherein the metadata recycling instruction comprises an index of a cache block to which to-be-recycled metadata belongs;

obtaining a former cache block and a latter cache block of the cache block according to the index of the cache block;

combining the cache block with an idle-state cache block in the former cache block and the latter cache block into a new buddy group; and adding the new buddy group to the global buddy queue and a buddy queue of the metadata group according to a quantity of cache blocks comprised in the new buddy group.

10. The method according to claim 9, wherein if the idle-state cache block in the former cache block and the latter cache block belongs to a buddy group, the new buddy group comprises the cache block and a cache block that is comprised in the buddy group to which the idle-state cache block in the former cache block and the latter cache block belongs.

11. The method according to claim 9, the method further comprising:

in response to determining that neither the former cache block nor the latter cache block is in an idle state, adding the cache block to a global single cache queue and a single cache queue of the metadata group.

12. An apparatus for writing data into a cache, wherein a storage area of a flash corresponding to the cache comprises multiple flash chunks, wherein one flash chunk comprises one chunk metadata area and one chunk data area, wherein the chunk metadata area comprises at least one metadata block, wherein the chunk data area comprises at least one data area corresponding to the at least one metadata block, wherein the metadata block comprises multiple pieces of metadata, wherein the data area comprises multiple data blocks, wherein the metadata block is in a one-to-one correspondence with the data area, and wherein the metadata is in a one-to-one correspondence with the data block, and wherein the apparatus comprises at least one processor and a memory coupled to the at least one processor, wherein the memory has a plurality of instructions stored thereon, that when executed by the at least one processor, cause the at least one processor to:

receive an IO request write command, wherein the IO request write command comprises metadata of to-be-written data;

obtain a buddy group that is currently being processed from a global buddy queue, and use the obtained buddy group as a first buddy group, wherein the global buddy queue comprises one or more metadata groups, wherein each of the one or more metadata groups is corresponding to one metadata block of the flash and comprises one or more buddy groups, wherein each of the one or more buddy groups comprises multiple cache blocks in a memory such that addresses of cache blocks included in one buddy group are successive, wherein each of the multiple cache blocks is configured to store a piece of metadata;

determine whether the first buddy group has one or more remaining cache blocks and whether all metadata of the to-be-written data can be written into the one or more remaining cache blocks; and in response to determining that the first buddy group has the one or more remaining cache blocks and that all the metadata of the to-be-written data can be written into the remaining cache blocks:

write all the metadata of the to-be-written data into the one or more remaining cache blocks in the first buddy group; and write all the metadata of the to-be-written data into a metadata block corresponding to a metadata group to which the first buddy group belongs.

13. The apparatus according to claim 12, wherein the instructions further cause the at least one processor to:

in response to determining that the first buddy group has no remaining cache blocks or that all the metadata of the to-be-written data cannot be written into the remaining cache blocks, determine whether a buddy queue of the metadata group to which the first buddy group belongs has a second buddy group having one or more remaining cache blocks and whether all the metadata of the to-be-written data can be written into the one or more remaining cache blocks of the second buddy group; and in response to determining that the buddy queue of the metadata group to which the first buddy group belongs has the second buddy group having one or more remaining cache blocks and that all the metadata of the to-be-written data can be written into the one or more remaining cache blocks of the second buddy group:

obtain the second buddy group from the buddy queue of the metadata group to which the first buddy group belongs;

write all the metadata of the to-be-written data into the one or more remaining cache blocks in the second buddy group; and write all the metadata of the to-be-written data into a metadata block corresponding to the metadata group to which the second buddy group belongs, and wherein the global buddy queue comprises buddy groups in buddy queues of all metadata groups.

14. The apparatus according to claim 13, wherein the instructions further cause the processor to:

in response to determining that the buddy queue of the metadata group to which the first buddy group belongs has no second buddy group in which all the metadata of the to-be-written data can be written into one or more remaining cache blocks of the second buddy group, determine whether the global buddy queue has a third buddy group in which all the metadata of the to-be-written data can be written into one or more remaining cache blocks of the third buddy group, wherein the third buddy group belongs to a different metadata group from the metadata group of the first buddy group; and in response to determining that the global buddy queue has the third buddy group in which all the metadata of the to-be-written data can be written into one or more remaining cache blocks of the third buddy group:

obtain the third buddy group from the global buddy queue;

write all the metadata of the to-be-written data into the one or more remaining cache blocks in the third buddy group; and write all the metadata of the to-be-written data into a metadata block corresponding to a metadata group to which the third buddy group belongs.

15. The apparatus according to claim 14, wherein the instructions further cause the processor to:

in response to determining that the global buddy queue has no third buddy group in which all the metadata of the to-be-written data can be written into a remaining cache block, determine whether a global single cache queue has enough remaining cache blocks into which all the metadata of the to-be-written data can be written; and in response to determining that the global single cache queue has enough remaining cache blocks:

obtain, from the global single cache queue, the remaining cache blocks into which all the metadata of the to-be-written data can be written;

write all the metadata of the to-be-written data into the obtained remaining cache blocks in the global single cache queue; and write all the metadata of the to-be-written data into metadata blocks corresponding to metadata groups to which the remaining cache blocks in the global single cache queue belong, and wherein the global single cache queue comprises single cache blocks that are comprised in single cache queues of all metadata groups and that cannot form a buddy group with another cache block.

16. The apparatus according to claim 12, wherein the cache blocks comprised in each buddy group are successively arranged according to addresses.

17. The apparatus according to claim 12, wherein a quantity of remaining cache blocks comprised in each buddy group is recorded in both the global buddy queue and a buddy queue of the metadata group, and wherein a quantity of remaining cache blocks that is recorded in the global buddy queue is different from a quantity of remaining cache blocks that is recorded in each queue in the buddy queue of the metadata group.

* * * * *